Nov. 5, 1935.  C. A. KALINA  2,020,063
HOG OILER
Filed May 2, 1935
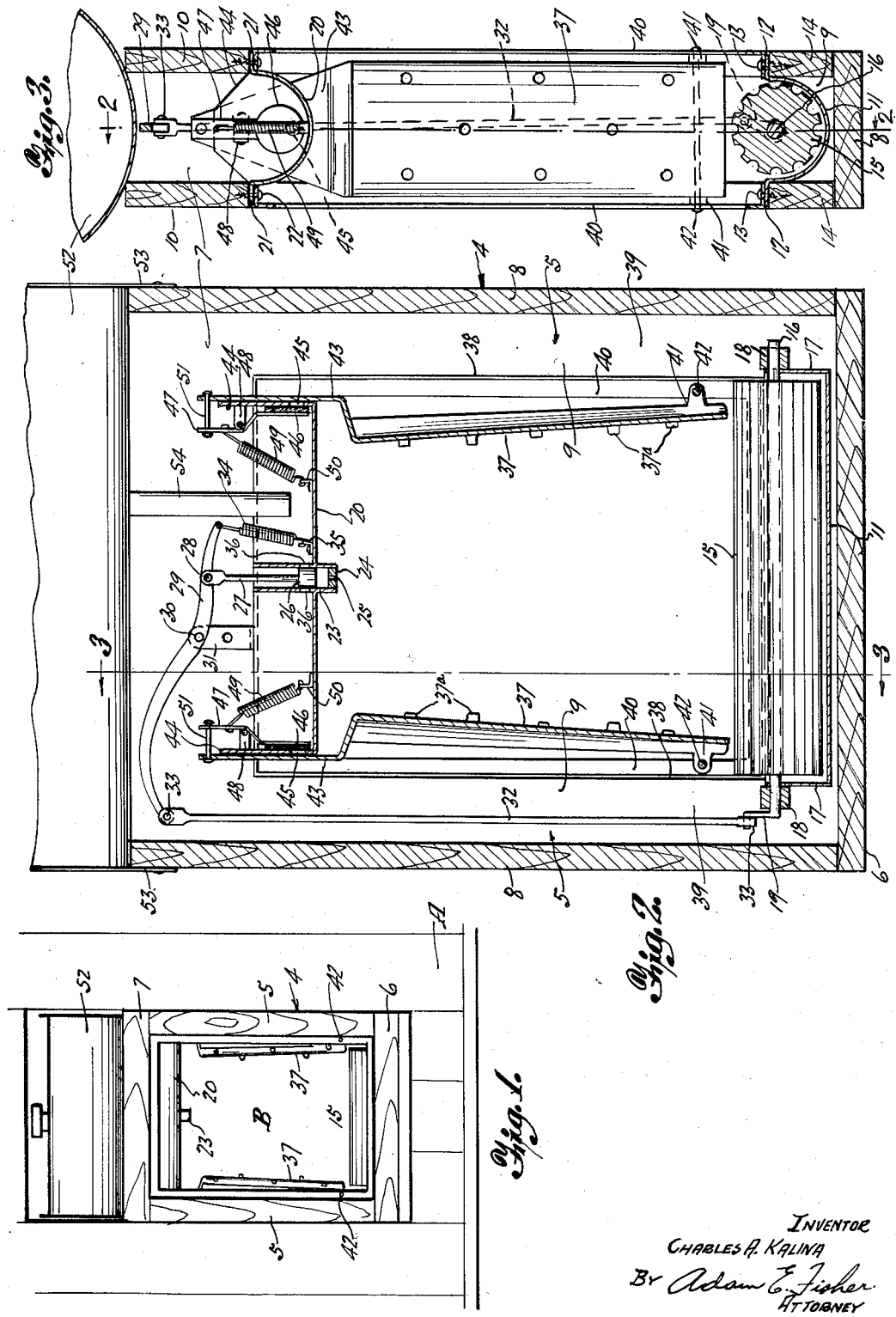
INVENTOR
CHARLES A. KALINA
By Adam E. Fisher
ATTORNEY Patented Nov. 5, 1935

2,020,063

UNITED STATES PATENT OFFICE 2,020,063

HOG OILER

Charles A. Kalina, Exeter, Nebr.

Application May 2, 1935, Serial No. 19,351

2 Claims. (Cl. 119—156)

My invention relates to improvements in hog oilers and the main object is to provide an assembly which may be built in a gate, fence or wall so as to form a pathway or entrance for the hogs to and from their sleeping and eating quarters or the like and which includes means for automatically applying oil to the sides, back and belly of the hogs as they pass through.

Another object is to provide a device of this kind including a rectangular frame, each side of which is of U-shaped cross section with the bight turned outwardly, a trough at the bottom of the frame, a roller journaled in the trough, side plates pivoted at their lower ends and disposed within the sides of the frame, a trough at the top of the frame, a pump having an inlet in this trough and an outlet over the center of the frame, a crank for operating the pump by the rotation of the roller, valves operated by outward pressure on the side plates to permit a flow of oil from the upper trough down over the side plates into the lower trough, and a supply tank connected to the upper trough.

With these and other objects in view the invention resides in the novel construction and arrangement of parts as hereinafter fully set forth and claimed, reference being had to the accompanying drawing wherein:

Figure 1 is an elevation of my device as mounted in a wall.

Figure 2 is an enlarged vertical and medial cross section through the oiler alone taken on the line 2—2 in Figure 3.

Figure 3 is a section along the line 3—3 in Figure 2.

Referring now with more particularity to the drawing my invention comprises a rectangular frame 4 of any suitable size and construction comprising sides 5, a bottom 6 and top 7. The sides and bottom as shown are of U-shaped cross section with the bights 8 turned outward whereby partially enclosed and inwardly opening valleys or recesses 9 are formed within. The top 7 has no outer bight and simply comprises the two spaced and parallel side members 10 as shown.

A lower trough 11 of semi-circular cross section is placed within the recess 9 in the bottom 6 and is held in place by lateral flanges 12 secured by screws 13 to the upper margins of the side members 14 of said bottom. A large longitudinally grooved applicator roller 15 is placed in this trough 11 and its shaft 16 is journaled through the ends 17 of said trough and through bearings 18 affixed thereto, one end of the shaft being provided outwardly of the adjacent bearing with a crank 19. An upper trough 20 of similar size and shape is secured beneath the top 7 by lateral flanges 21 screwed at 22 to the undersides of the side members 10 and this trough has a centrally and vertically mounted pump cylinder 23 extended down through its bottom. A plug 24 having a restricted port or opening 25 is mounted in this lower end of the pump cylinder 23 and a piston 26 is slidably mounted above. The piston rod 27 of this piston 26 extends out through the open upper end of the pump cylinder and is pivoted at 28 to an operating crank lever 29 which is fulcrumed at 30 to a bracket 31 secured between the side members 10 above the trough 20. The said crank lever 29 extends outwardly to a point adjacent one side 5 above the crank 19 and is connected thereto by a link 32 pivotally connected at its ends 33 to these parts. At the opposite end the crank lever 29 extends past the piston rod connection 28 and is connected to a retractile coil spring 34 stretched between this lower end and the bracket 35 affixed to the bottom of the trough 20. Diametrically opposed inlet openings 36 are formed in the pump cylinder 23 just above the bottom of the trough. The spring 34 normally lowers the piston 26 so that these openings 36 are closed as shown.

Side applicator plates 37 of arcuate cross section are hinged at their lower ends to the sides 5 of the frame and extend upwardly and inwardly of these sides as shown. The said plates 37 have knobs or studs 37a on their inner sides. To make this hinged connection, small angle irons 38 are secured to the inner faces of the side members 39 with their webs 40 turned inwardly and apertured ears 41 are turned out from the margins of the plates 37 and pivotally mounted between these webs 40 just over the roller 15 by hinge pins 42 passed through the ears and webs. The plates 37 are arranged to normally incline inwardly toward their upper ends as shown and have valve operating arms or fingers 43 turned outwardly and then upwardly past the ends 44 of the upper trough 20. Valve apertures 45 are formed in these ends 44 near the trough bottom and are normally closed by disk valves 46 which have extended arms 47 fulcrumed between brackets 48 secured within the ends 44 above the apertures. Retractile coil springs 49 are stretched between the upper ends of these arms 47 and brackets 50 secured to the bottom of the trough inwardly of the valves and connecting pins or links 51 connect the upper ends of the fingers 43 and arms 47 above the trough. The springs 49, of course, normally hold the valves 46 closed tight over the apertures 45. A supply tank 52 of any desired shape and size is mounted above the frame by brackets 53 and has a spout 54 depended down into the upper trough 20 near the bottom thereof and being filled with oil or the like feeds the same to the trough.

In use the frame 4 thus formed is mounted or built in a wall A or fence through which the hogs will pass or may be driven so that the opening B through the device will form a passageway for the hogs. Now as a hog passes through it will engage and rotate the roller 15 turning the crank 19, actuating the lever 29 and operating the piston 26 to first take in oil or other antivermin liquid from the trough 20 and then eject the same down through the port 25 onto the animal. At the same time the animal will press the side applicator plates 37 outward at their upper ends moving them away from the ends of the trough 20 and swinging the valves 46 away from the openings 45 whereby oil will run from the trough at each end down over the plates 37 and will be applied thereby to the sides of the animal. The surplus oil drops from the plates 37 into the lower trough 11 and is picked up therefrom by the roller 15 and applied to the animal's belly as it passes through. This action is, of course, repeated each time a hog passes through the opening B and when not in use all openings from the trough 20 are closed by the various springs as will be understood. It will be evident that the hogs are completely covered and protected by the oil by the "four sided" dispensing means in my device.

While I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. A hog oiler comprising a rectangular frame, a lower trough mounted in the bottom thereof, a roller journaled in the trough, a crank at one end of the roller, an upper trough mounted at the top of the frame, a supply tank for supplying oil to the upper trough, a pump cylinder extended vertically through the bottom of the upper trough, the said cylinder having a restricted discharge opening in its lower end and inlet openings in its walls within the trough, a piston mounted in the cylinder, a crank lever fulcrumed above the trough and extending at one end over the cylinder, a piston rod extended from the piston and pivoted to the crank lever, the said crank lever being spring set to normally move the piston downward in the cylinder, and a link connecting the other end of the crank lever to the crank on the roller.

2. A hog oiler comprising a rectangular frame, a lower trough mounted in the bottom thereof, a roller journaled in the trough, a crank at one end of the roller, an upper trough mounted at the top of the frame, a supply tank for supplying oil to the upper trough, a pump cylinder extended vertically through the bottom of the upper trough, the said cylinder having a restricted discharge opening in its lower end and inlet openings in its walls within the trough, a piston mounted in the cylinder, a crank lever fulcrumed above the trough and extending at one end over the cylinder, a piston rod extended from the piston and pivoted to the crank lever, the said crank lever being spring set to normally move the piston downward in the cylinder, a link connecting the other end of the crank lever to the crank on the roller, side applicator plates hinged at their lower ends to the frame side and normally inclining inwardly at their upper ends, valve operating fingers extended outwardly and upwardly from the upper ends of the side plates past the ends of the upper trough, the said ends of the upper trough having valve openings, valves hinged to the ends of the upper trough and spring set to normally close the said valve openings, arms extended upward from the valves, and pins connecting the ends of the arms and the said valve operating fingers whereby outward pressure on the side plates will open the said valves.

CHARLES A. KALINA.